United States Patent
Young et al.

(10) Patent No.: US 9,721,203 B1
(45) Date of Patent: Aug. 1, 2017

(54) PERFORMING KERNEL STRIDING IN HARDWARE

(71) Applicant: Google Inc., Mountain View, CA (US)

(72) Inventors: Reginald Clifford Young, Palo Alto, CA (US); William John Gulland, Novato, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/467,382

(22) Filed: Mar. 23, 2017

Related U.S. Application Data

(63) Continuation of application No. 15/348,199, filed on Nov. 10, 2016.

(51) Int. Cl.
*G06N 3/02* (2006.01)
*G06N 3/08* (2006.01)

(52) U.S. Cl.
CPC ........ *G06N 3/08* (2013.01); *G06N 3/02* (2013.01)

(58) Field of Classification Search
CPC .................................. G06N 3/08; G06N 3/02
See application file for complete search history.

(56) References Cited

U.S. PATENT DOCUMENTS

| | | | |
|---|---|---|---|
| 6,505,224 B1 | 1/2003 | Kechriotis | |
| 7,653,675 B2 | 1/2010 | Myers et al. | |
| 7,895,252 B2 | 2/2011 | Sazegari et al. | |
| 8,224,110 B2 | 7/2012 | Mishima et al. | |
| 8,458,635 B2 | 6/2013 | Ni et al. | |
| 2016/0062947 A1 | 3/2016 | Chetlur et al. | |

FOREIGN PATENT DOCUMENTS

EP 3035204 6/2016

OTHER PUBLICATIONS

Sparse Convolutional Neural Networks, by Lui, published 2015.*
Replicating Kernels with a Short Stride Allows Sparse Reconstructions with Fewer Independent Kernels, by Schultz, published 2014.*
Dense CNN Learning with Equivalent Mappings, by Wu, published 2016.*

\* cited by examiner

*Primary Examiner* — Stanley K Hill
*Assistant Examiner* — Thomas Fink
(74) *Attorney, Agent, or Firm* — Fish & Richardson P.C.

(57) ABSTRACT

Methods for receiving a request to process, on a hardware circuit, a neural network comprising a first convolutional neural network layer having a stride greater than one, and in response, generating instructions that cause the hardware circuit to, during processing of an input tensor, generate a layer output tensor equivalent to an output of the first convolutional neural network layer by processing the input tensor using a second convolutional neural network layer having a stride equal to one but that is otherwise equivalent to the first convolutional neural network layer to generate a first tensor, zeroing out elements of the first tensor that would not have been generated if the second convolutional neural network layer had the stride of the first convolutional neural network layer to generate a second tensor, and performing max pooling on the second tensor to generate the layer output tensor.

20 Claims, 10 Drawing Sheets

15/348,199, filed on Nov. 10, 2016. The prior application is incorporated herein by reference in its entirety.

PERFORMING KERNEL STRIDING IN HARDWARE

CROSS REFERENCE TO RELATED APPLICATIONS

This application is a continuation of U.S. patent application Ser. No. 15/348,199, filed on Nov. 10, 2016. The prior application is incorporated herein by reference in its entirety.

BACKGROUND

This specification relates to computing neural network inferences in hardware.

Neural networks are machine learning models that employ one or more layers to generate an output, e.g., a classification, for a received input. Some neural networks include one or more hidden layers in addition to an output layer. The output of each hidden layer is used as input to another layer in the network, e.g., the next hidden layer or the output layer of the network. Each layer of the network generates an output from a received input in accordance with current values of a respective set of parameters.

SUMMARY

In general, this specification describes a special-purpose hardware circuit that computes neural network inferences.

In general, one innovative aspect of the subject matter described in this specification can be embodied in methods and systems for receiving a request to process a neural network on a hardware circuit, the neural network comprising a first convolutional neural network layer having a stride that is greater than one, and in response, generating instructions that when executed by the hardware circuit cause the hardware circuit to, during processing of an input tensor by the neural network, generate a layer output tensor that is equivalent to an output of the first convolutional neural network layer by performing operations comprising, processing the input tensor to the first convolutional neural network layer using a second convolutional neural network layer that has a stride that is equal to one but is otherwise equivalent to the first convolutional neural network layer to generate a first tensor, zeroing out elements of the first tensor that would not have been generated if the second convolutional neural network layer had the stride of the first convolutional neural network layer to generate a second tensor, and performing max pooling on the second tensor to generate the layer output tensor.

Implementations can include one or more of the following features. In some implementations, zeroing out elements of the first tensor comprises multiplying a subset of elements of the first tensor by zero, and multiplying the elements of the first tensor that are not included in the subset by one. Zeroing out elements of the first tensor comprises performing element-wise multiplication of a masking tensor and the first tensor to generate the second tensor, wherein the masking tensor comprises (i) zeros at each element position of the masking tensor that corresponds to an element of the first tensor that would not have been generated if the second convolutional neural network layer had the stride of the first convolutional neural network layer, and (ii) ones at each other element position of the masking tensor. In some implementations, the masking tensor is stored at a memory accessible by the hardware circuit, and wherein element-wise multiplication of the masking tensor and the first tensor is performed by a vector computation unit implemented in hardware that is included in the hardware circuit.

Implementations can further include one or more of the following features. In some implementations, zeroing out elements of the first tensor comprises performing element-wise multiplication of a first masking tensor and the first tensor to generate a modified first tensor, wherein the first masking tensor comprises (i) zeros at each element position of the masking tensor that corresponds to an element of the first tensor that would not have been generated if the second convolutional neural network layer had the stride of the first convolutional neural network layer, and (ii) a respective non-zero value at each element position of the masking tensor that corresponds to an element of the first tensor that would have been generated if the second convolutional neural network layer had the stride of the first convolutional neural network layer, and performing element-wise multiplication of a second masking tensor and the modified first tensor, wherein the second masking tensor comprises, at each element position that corresponds to an element of the first tensor that would be generated if the second convolutional neural network layer had the stride of the first convolutional neural network layer, an inverse of the respective non-zero value of the first masking tensor.

Implementations can further include one or more of the following features. In some implementations, performing max pooling comprises obtaining, for each of one or more windows of the second tensor that are defined by the stride of the first convolutional neural network layer, a maximum value element of elements within the window. Each of the one or more windows of the second tensor is a rectangular window having dimensions corresponding to the stride of the convolutional neural network layer, and includes different elements of the second tensor. In some implementations, performing max pooling comprises obtaining, for each of one or more subsets of elements of the second tensor, a maximum value element of the subset. The max pooling performed on the second tensor is performed by pooling circuitry of the hardware circuit. The convolutional neural network layer is a first neural network layer in the neural network, and wherein the input tensor is a representation of a digital image comprising elements that correspond to pixels of the digital image.

Implementations can further include one or more of the following features. In some implementations, the input tensor is stored at a unified buffer of the hardware circuit and weights of the second convolutional neural network layer are stored at a dynamic memory of the hardware circuit, and wherein processing the input tensor to the first convolutional neural network layer using the second convolutional neural network layer comprises sending the input tensor from the unified buffer to a matrix computation unit of the hardware circuit that is implemented in hardware, sending the weights of the second convolutional neural network layer from the dynamic memory to the matrix computation unit of the hardware circuit, and processing, by the matrix computation unit of the hardware circuit, the input tensor using the weights of the second convolutional neural network layer to generate the first tensor.

Particular embodiments of the subject matter described in this specification can be implemented so as to realize one or more of the following advantages. An output tensor corresponding to a convolutional neural network layer having a stride greater than one can be generated in hardware by a special-purpose hardware circuit, even where the hardware circuit cannot directly process an input tensor using a convolutional neural network having a stride greater than one. By generating the appropriate output using the special-purpose hardware circuit, the processing of a neural network layer having a stride greater than one can be performed without passing data back to a host computer, i.e., without performing at least a part of the computation off-chip, even though the special-purpose hardware circuit does not directly support such processing. This allows for an inference of a neural network that includes a convolutional layer having a stride greater than one to be determined efficiently without modifying the hardware architecture of the special-purpose hardware circuit. That is, processing delays resulting from performing part of the processing off-chip, in software, or both, are avoided.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
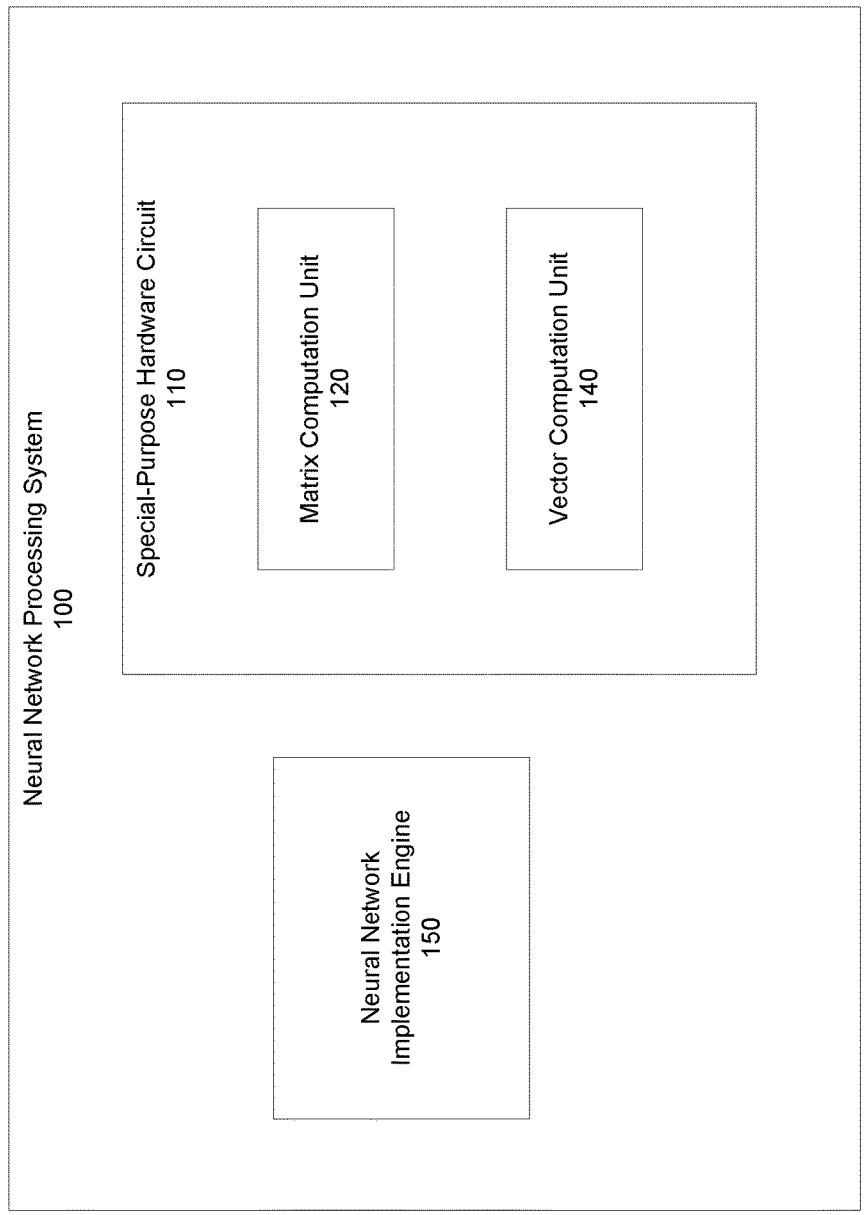
FIG. 1 shows an example neural network processing system.

A neural network having multiple layers can be used to compute inferences. For example, given an input, the neural network can compute an inference for the input. The neural network computes this inference by processing the input through each of the layers of the neural network. Each layer receives an input and processes the input in accordance with the set of weights for the layer to generate an output.

Therefore, in order to compute an inference from a received input, the neural network receives the input and processes it through each of the neural network layers to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

In some implementations, the layers of the neural network are arranged in a sequence. In some other implementations, the layer are arranged as directed graph. That is, any particular layer can receive multiple inputs, multiple outputs, or both. The layers of the neural network can also be arranged such that an output of a layer can be sent back as an input to a previous layer.

Some neural networks pool outputs from one or more neural network layers to generate pooled values that are used as inputs to subsequent neural network layers. In some implementations, the neural network pools a group of outputs by determining a maximum, minimum, or average of the group of outputs and using the maximum, minimum, or average as the pooled output for the group. Pooling the outputs can maintain some spatial invariance so the outputs arranged in various configurations can be processed to have the same inference. Pooling the outputs can also reduce dimensionality of inputs received at the subsequent neural network layers while maintaining desired characteristics of the outputs before pooling, which can improve efficiency without significantly compromising the quality of inferences generated by the neural networks.

Some neural networks include one or more convolutional neural network layers having a stride that is greater than one. Conceptually, for a stride of one, a convolutional neural network layer can apply sets of weights to activation inputs sequentially. That is, for an activation input array, weights can be applied to a subset of the activation inputs and moved by one position, e.g., row or column, to each other subset of the activation inputs until the convolution computation is complete. For a convolutional neural network layer having a stride greater than one, where the stride is an integer, the weights can be applied to a subset of the activation inputs and moved by a number of positions equivalent to the stride, e.g., by the number of rows or columns indicated by the stride, to each other subset of the activation inputs until the convolution computation is complete.

This specification describes special-purpose hardware circuitry that processes neural network layers, and optionally performs pooling on outputs of one or more neural network layers. The special-purpose hardware circuit includes circuitry capable of processing neural network layers having a stride of one. While the special-purpose hardware circuitry does not directly support processing of neural network layers having a stride greater than one, the special-purpose hardware circuitry may be controlled to produce an output equivalent to an output of a neural network layer having a stride greater than one.

FIG. 1 shows an example neural network processing system 100. The neural network processing system 100 is an example of a system implemented as one or more computers in one or more locations in which the systems, components, and techniques described below can be implemented.

The neural network processing system 100 is a system that performs neural network computations using a special-purpose hardware circuit 110. The hardware circuit 110 is an integrated circuit for performing neural network computations and includes a matrix computation unit 120 that performs vector-matrix multiplications in hardware. The hardware circuit 110 also includes a vector computation unit 140 that includes pooling circuitry for performing pooling on outputs of the matrix computation unit 120. An example special-purpose hardware circuit 120 is described in more detail below with reference to FIG. 3.

In particular, the neural network processing system 100 receives requests to implement neural networks on the special-purpose hardware circuit 110, implements the neural networks on the special-purpose hardware circuit 110, and, once a given neural network is implemented, processes inputs to the neural network using the special-purpose integrated circuit 110 to generate neural network inferences.

That is, the neural network processing system 100 can receive a request that specifies a neural network architecture for a neural network that is to be used to process inputs. The neural network architecture defines the number and configuration of layers in the neural network and values of the parameters for each of the layers that has parameters.

To implement a neural network on the special-purpose integrated circuit 110, the neural network processing system 100 includes a neural network implementation engine 150 that is implemented as one or more computer programs on one or more computers in one or more physical locations.

The neural network implementation engine 150 generates instructions that, when executed by the special-purpose hardware circuit 110, cause the hardware circuit 110 to perform the operations specified by the neural network to generate a neural network output from a received neural network input.

Once the instructions have been generated by the neural network implementation engine 150 and provided to the hardware circuit 110, the neural network processing system 100 can receive neural network inputs and can process the neural network inputs using the neural network by causing the hardware circuit 110 to execute the generated instructions.

Some neural networks, however, include one or more incompatible neural network layers. The term incompatible neural network layer as used in this specification refers to a neural network layer that specifies an operation that cannot be directly performed in hardware by the special-purpose hardware circuit 110. To implement these neural networks on the hardware circuit 110, the neural network implementation engine 150 generates instructions that, when executed by the hardware circuit 110, cause the hardware circuit 110 to generate an output for the incompatible neural network layer by performing operations in hardware that are different from those specified by the neural network layer but that result in a layer output being generated that satisfies the specification of the incompatible neural network layer, i.e., a layer output that is the same as an output that would have been generated by directly performing the operations specified by the layer.

In particular, some neural networks include a convolutional neural network layer having a stride greater than one. Such a neural network layer features one or more kernels that are processed non-sequentially with an input tensor. For example, instead of being applied sequentially to elements of the input tensor as in a neural network layer with a stride of one, a kernel of a neural network layer with a stride of two is shifted such that a particular element of the kernel is applied to every-other element of the input tensor to generate an output tensor. The output tensor can then be used as input by another layer of the neural network.

Because the main hardware unit that performs matrix operations on the hardware circuit 110 is the matrix computation unit 120, the integrated circuit cannot directly compute a neural network layer having a stride greater than one. To implement a neural network that includes a layer having a stride greater than one, the neural network implementation engine 150 generates instructions that, when executed by the special-purpose hardware circuit 110 during processing of a neural network input by the neural network, cause the hardware circuit 110 to perform other operations in hardware to generate an output tensor that satisfies the specification of the neural network layer having the stride greater than one using the matrix multiplication unit 120 and the vector computation unit 140 featuring the pooling circuitry. These instructions and other operations are described in more detail below with reference to FIGS. 7-10.

Figure 2:
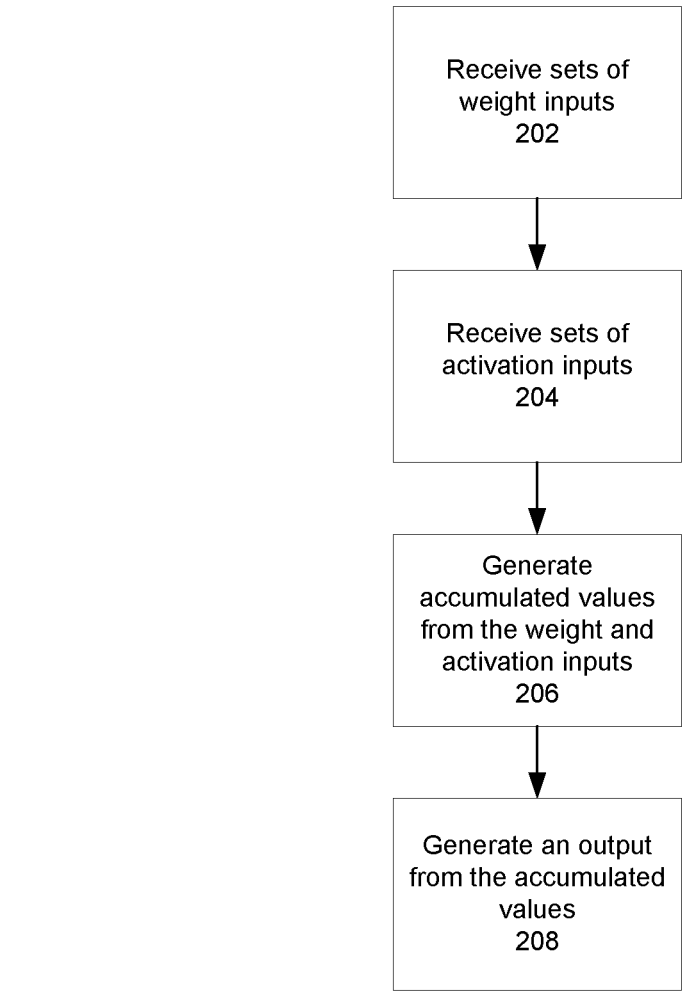
FIG. 2 is a flow diagram of an example method for performing a computation for a given layer of a neural network.

FIG. 2 is a flow diagram of an example process 200 for performing a computation for a given layer of a neural network using a special-purpose hardware circuit. For convenience, the method 200 will be described with respect to a system having one or more circuits that performs the method 200. The method 200 can be performed for each layer of the neural network in order to compute an inference from a received input.

The system receives sets of weight inputs (step 202) and sets of activation inputs (step 204) for the given layer. The sets of weight inputs and the sets of activation inputs can be received from dynamic memory and a unified buffer, respectively, of the special-purpose hardware circuit. In some implementations, both the sets of weight inputs and the sets of activation inputs can be received from the unified buffer.

The system generates accumulated values from the weight inputs and the activation inputs using a matrix multiplication unit of the special-purpose hardware circuit (step 206). In some implementations, the accumulated values are dot products of the sets of weight inputs and the sets of activation inputs. That is, for one set of weights, which is a subset of all weights in the layer, the system can multiply each weight input with each activation input and sum the products together to form an accumulated value. The system can then compute dot products of other set of weights with other sets of activation inputs. In some implementations, the special-purpose hardware circuit may perform such operations similarly regardless of the stride of the particular neural network layer, i.e., whether the neural network layer has a stride of one or a stride greater than one. Subsequent processing of the outputs from the matrix multiplication unit can be performed to generate an output that is equivalent to an output that would be produced if the neural network layer was processed with a specified stride that is greater than one.

The system can generate a layer output from the accumulation values (step 208) using a vector computation unit of the special-purpose hardware circuit. In some implementations, the vector computation unit applies an activation function to the accumulated values, which will be described further below in reference to FIG. 5. The output of the layer can be stored in the unified buffer for use as an input to a subsequent layer in the neural network or can be used to determine the inference. In some implementations, the neural network layer may specify a stride greater than one, and the system may perform additional processing on the accumulation values to obtain a layer output that is equivalent to an output of the neural network layer having the stride greater than one. The system finishes processing the neural network when a received input has been processed through each layer of the neural network to generate the inference for the received input.

Figure 3:
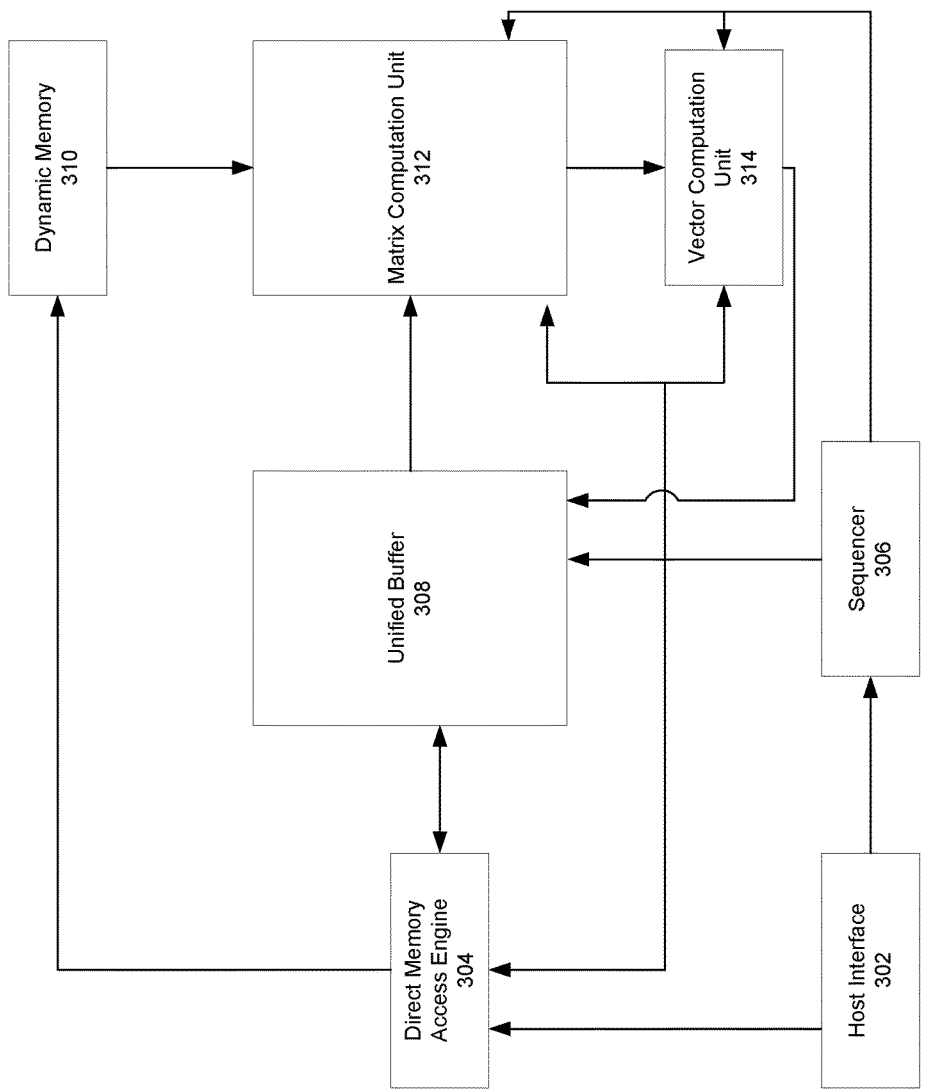
FIG. 3 shows an example neural network processing system.

FIG. 3 shows an example special-purpose hardware circuit 300 for performing neural network computations. The system 300 includes a host interface 302. The host interface 302 can receive instructions that include parameters for a neural network computation. The parameters can include one or more of the following: how many layers should be processed, corresponding sets of weight inputs for each layer of the model, an initial set of activation inputs, i.e., the input to the neural network from which the inference is to be computed, corresponding input and output sizes of each layer, a stride value for the neural network computation, and a type of layer to be processed, e.g., a convolutional layer or a fully connected layer.

The host interface 302 can send the instructions to a sequencer 306, which converts the instructions into low level control signals that control the circuit to perform the neural network computations. In some implementations, the control signals regulate dataflow in the circuit, e.g., how the sets of weight inputs and the sets of activation inputs flow through the circuit. The sequencer 306 can send the control signals to a unified buffer 308, a matrix computation unit 312, and a vector computation unit 314. In some implementations, the sequencer 306 also sends control signals to a direct memory access engine 304 and dynamic memory 310. In some implementations, the sequencer 306 is a processor that generates control signals. The sequencer 306 can use timing of the control signals to, at appropriate times, send the control signals to each component of the circuit 300. In some other implementations, the host interface 302 passes in a control signal from an external processor.

The host interface 302 can send the sets of weight inputs and the initial set of activation inputs to the direct memory access engine 304. The direct memory access engine 304 can store the sets of activation inputs at the unified buffer 308. In some implementations, the direct memory access stores the sets of weights to dynamic memory 310, which can be a memory unit. In some implementations, the dynamic memory 310 is located off of the circuit.

The unified buffer 308 is a memory buffer. It can be used to store the set of activation inputs from the direct memory access engine 304 and outputs of the vector computation unit 314. The vector computation unit 314 will be described in more detail below with reference to FIG. 6. The direct memory access engine 304 can also read the outputs of the vector computation unit 314 from the unified buffer 308.

The dynamic memory 310 and the unified buffer 308 can send the sets of weight inputs and the sets of activation inputs, respectively, to the matrix computation unit 312. In some implementations, the matrix computation unit 312 is a two-dimensional systolic array. The matrix computation unit 312 can also be a one-dimensional systolic array or other circuitry that can perform mathematical operations, e.g., multiplication and addition. In some implementations, the matrix computation unit 312 is a general purpose matrix processor.

The matrix computation unit 312 can process the weight inputs and the activation inputs and provide a vector of outputs to the vector computation unit 314. In some implementations, the matrix computation unit 312 sends the vector of outputs to the unified buffer 308, which sends the vector of outputs to the vector computation unit 314. The vector computation unit 314 can process the vector of outputs and store a vector of processed outputs to the unified buffer 308. For neural network layers having a stride greater than one, the vector computation unit 314 can process the vector of outputs to generate a layer output tensor that is equivalent to an output of the neural network layer having the stride greater than one, and can store the layer output tensor at the unified buffer 308. The vector of processed outputs can be used as activation inputs to the matrix computation unit 312, e.g., for use in a subsequent layer in the neural network. The matrix computation unit 312 and the vector computation unit 314 will be described in more detail below with reference to FIG. 4 and FIG. 6, respectively.

Figure 4:
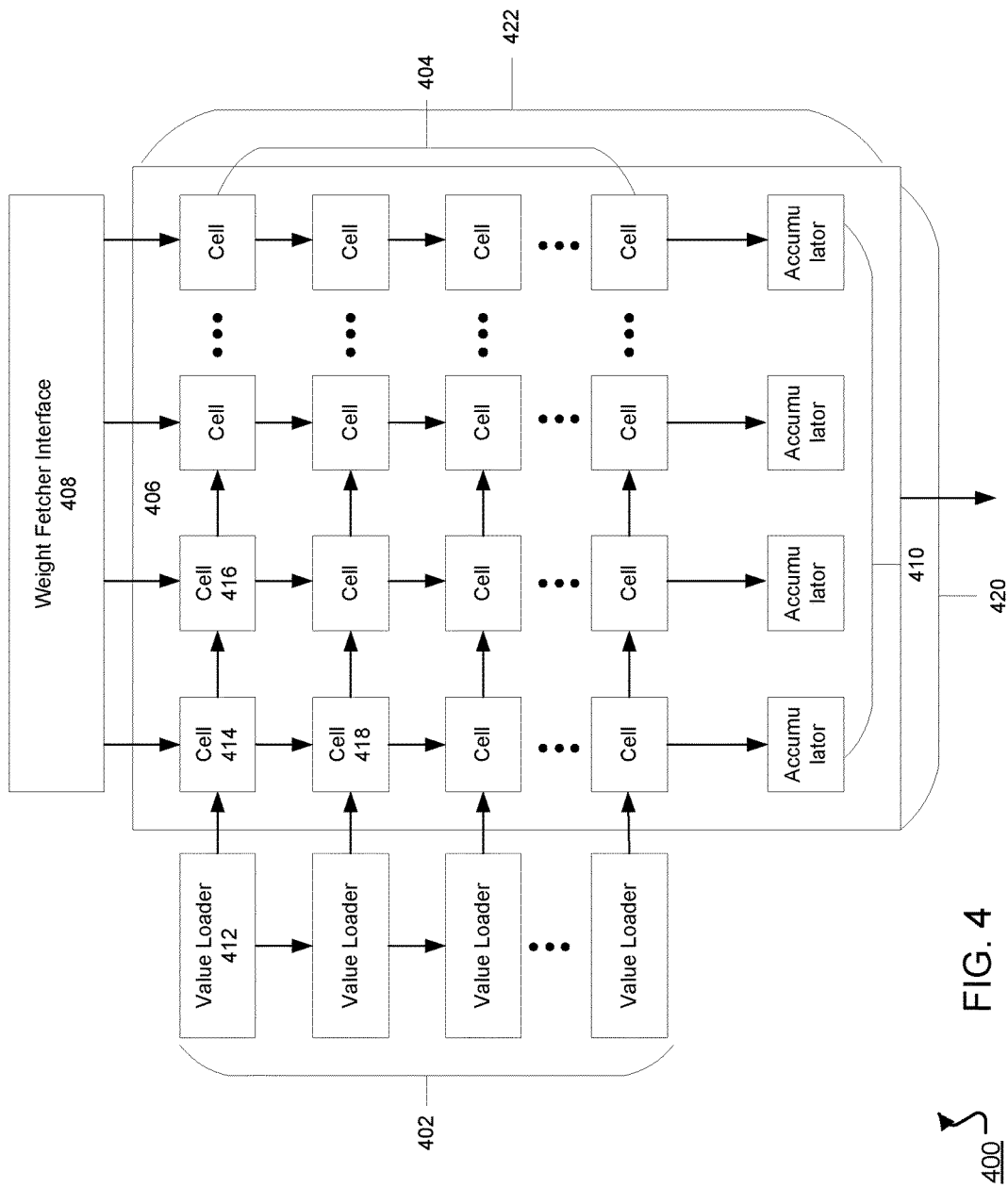
FIG. 4 shows an example architecture including a matrix computation unit.

FIG. 4 shows an example architecture 400 including a matrix computation unit. The matrix computation unit is a two-dimensional systolic array 406. The array 406 includes multiple cells 404. In some implementations, a first dimension 420 of the systolic array 406 corresponds to columns of cells and a second dimension 422 of the systolic array 406 corresponds to rows of cells. The systolic array can have more rows than columns, more columns than rows, or an equal number of columns and rows.

In the illustrated example, value loaders 402 send activation inputs to rows of the array 406 and a weight fetcher interface 408 sends weight inputs to columns of the array 406. In some other implementations, however, activation inputs are transferred to the columns and weight inputs are transferred to the rows of the array 406.

The value loaders 402 can receive the activation inputs from a unified buffer, e.g., the unified buffer 308 of FIG. 3. Each value loader can send a corresponding activation input to a distinct left-most cell of the array 406. For example, value loader 412 can send an activation input to cell 414.

The weight fetcher interface 408 can receive the weight input from a memory unit, e.g., the dynamic memory 310 of FIG. 3. The weight fetcher interface 408 can send a corresponding weight input to a distinct top-most cell of the array 406. For example, the weight fetcher interface 408 can send weight inputs to cells 414 and 416. The weight fetcher interface 408 is further capable of receiving multiple weights from the memory unit, e.g., the dynamic memory 310, and of sending the multiple weights to distinct top-most cells of the array 406 in parallel. For example, the weight fetcher interface 408 may send different weights to the cells 414 and 416 simultaneously.

In some implementations, a host interface, e.g., the host interface 302 of FIG. 3, shifts activation inputs throughout the array 406 along one dimension, e.g., to the right, while shifting weight inputs throughout the array 406 along another dimension, e.g., to the bottom. For example, over one clock cycle, the activation input at cell 414 can shift to an activation register in cell 416, which is to the right of cell 414. Similarly, the weight input at cell 416 can shift to a weight register at cell 418, which is below cell 414.

On each clock cycle, each cell can process a given weight input, a given activation input, and an accumulated output from an adjacent cell to generate an accumulated output. The accumulated output can also be passed to the adjacent cell along the same dimension as the given weight input. Each cell may also process a given weight input and a given activation input to generate an output, without processing an accumulated output from an adjacent cell. The output can be passed to adjacent cells along the same dimensions as the given weight input and output without being accumulated. An individual cell is described further below with reference FIG. 5.

In some implementations, an identity matrix, i.e., a matrix having ones on the principal diagonal and zeros elsewhere, can be passed to the array 406, thereby passing the inputs provided at the value loaders 402 to the accumulators 410 without modification. This may be used to perform element-wise multiplication of two inputs, where a first output at the accumulators can be represented as output=MatMul(input1, identity), where MatMul is an instruction for the matrix computation unit to perform matrix multiplication, and a second output corresponding to the element-wise multiplication result is represented as output *= MatMul(input2, identity). To perform the *= operation, i.e., the operation output=output * MatMul(input2, identity), the architecture 400 may include a component for performing a += or *= computations. The component for performing the += or *= operations may be positioned before the accumulators 410, i.e., after the last row of cells 404. In some implementations, the vector computation unit 314 of FIG. 3 may include the component for performing the += or *= operations, i.e., where the vector computation unit 314 performs the output *= MatMul(input2,identity) operation to perform element-wise multiplication. The accumulated output can be passed along the same column as the weight input, e.g., towards the bottom of the column in the array 406. In some implementations, at the bottom of each column, the array 406 can include accumulator units 410 that store and accumulate each accumulated output from each column when performing calculations with layers having more activation inputs than rows. In some implementations, each accumulator unit stores multiple parallel accumulations. The accumulator units 410 can accumulate each accumulated output to generate a final accumulated value. The final accumulated value can be transferred to a vector computation unit, e.g., the vector computation unit of FIG. 6. In some other implementations, the accumulator units 410 passes the accumulated values to the vector computation unit without performing any accumulations when processing layers with layers having fewer activating inputs than rows.

Figure 5:
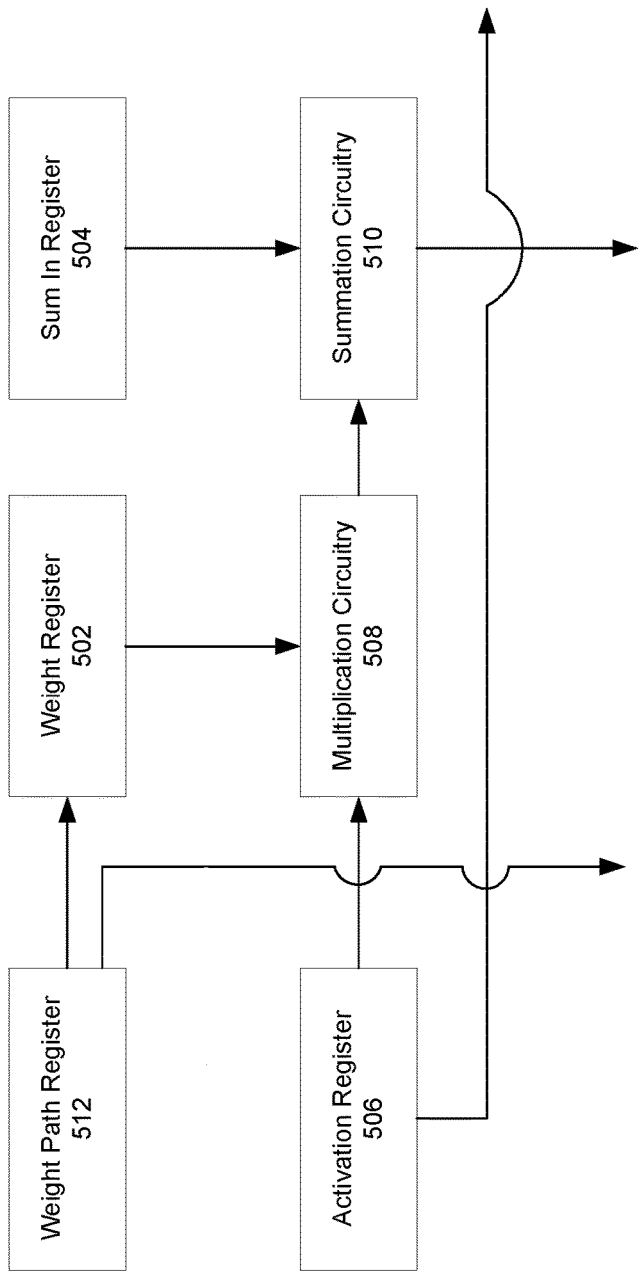
FIG. 5 shows an example architecture of a cell inside a systolic array.

FIG. 5 shows an example architecture 700 of a cell inside a systolic array, e.g., the systolic array 406 of FIG. 4.

The cell can include an activation register 506 that stores an activation input. The activation register can receive the activation input from a left adjacent cell, i.e., an adjacent cell located to the left of the given cell, or from a unified buffer, depending on the position of the cell within the systolic array. The cell can include a weight register 502 that stores a weight input. The weight input can be transferred from a top adjacent cell or from a weight fetcher interface, depending on the position of the cell within the systolic array. The cell can also include a sum in register 504. The sum in register 504 can store an accumulated value from the top adjacent cell. Multiplication circuitry 508 can be used to multiply the weight input from the weight register 502 with the activation input from the activation register 506. The multiplication circuitry 508 can output the product to summation circuitry 510.

The summation circuitry 510 can sum the product and the accumulated value from the sum in register 504 to generate a new accumulated value. The summation circuitry 510 can then send the new accumulated value to another sum in register located in a bottom adjacent cell. The new accumulated value can be used as an operand for a summation in the bottom adjacent cell. The summation circuitry 510 can also accept a value from the sum in register 504 and send the value from the sum in register 504 to a bottom adjacent cell without summing the value from the sum in register 504 with the product from the multiplication circuitry 508.

The cell can also shift the weight input and the activation input to adjacent cells for processing. For example, the weight path register 512 can send the weight input to another weight register in the bottom adjacent cell. The activation register 506 can send the activation input to another activation register in the right adjacent cell. Both the weight input and the activation input can therefore be reused by other cells in the array at a subsequent clock cycle.

In some implementations, the cell also includes a control register. The control register can store a control signal that determines whether the cell should shift either the weight input or the activation input to adjacent cells. In some implementations, shifting the weight input or the activation input takes one or more clock cycles. The control signal can also determine whether the activation input or weight inputs are transferred to the multiplication circuitry 508, or can determine whether the multiplication circuitry 508 operates on the activation and weight inputs. The control signal can also be passed to one or more adjacent cells, e.g., using a wire.

In some implementations, weights are pre-shifted into a weight path register 512. The weight path register 512 can receive the weight input, e.g., from a top adjacent cell, and transfer the weight input to the weight register 502 based on the control signal. The weight register 502 can statically store the weight input such that as activation inputs are transferred to the cell, e.g., through the activation register 506, over multiple clock cycles, the weight input remains within the cell and is not transferred to an adjacent cell. Therefore, the weight input can be applied to multiple activation inputs, e.g., using the multiplication circuitry 508, and respective accumulated values can be transferred to an adjacent cell.

Figure 6:
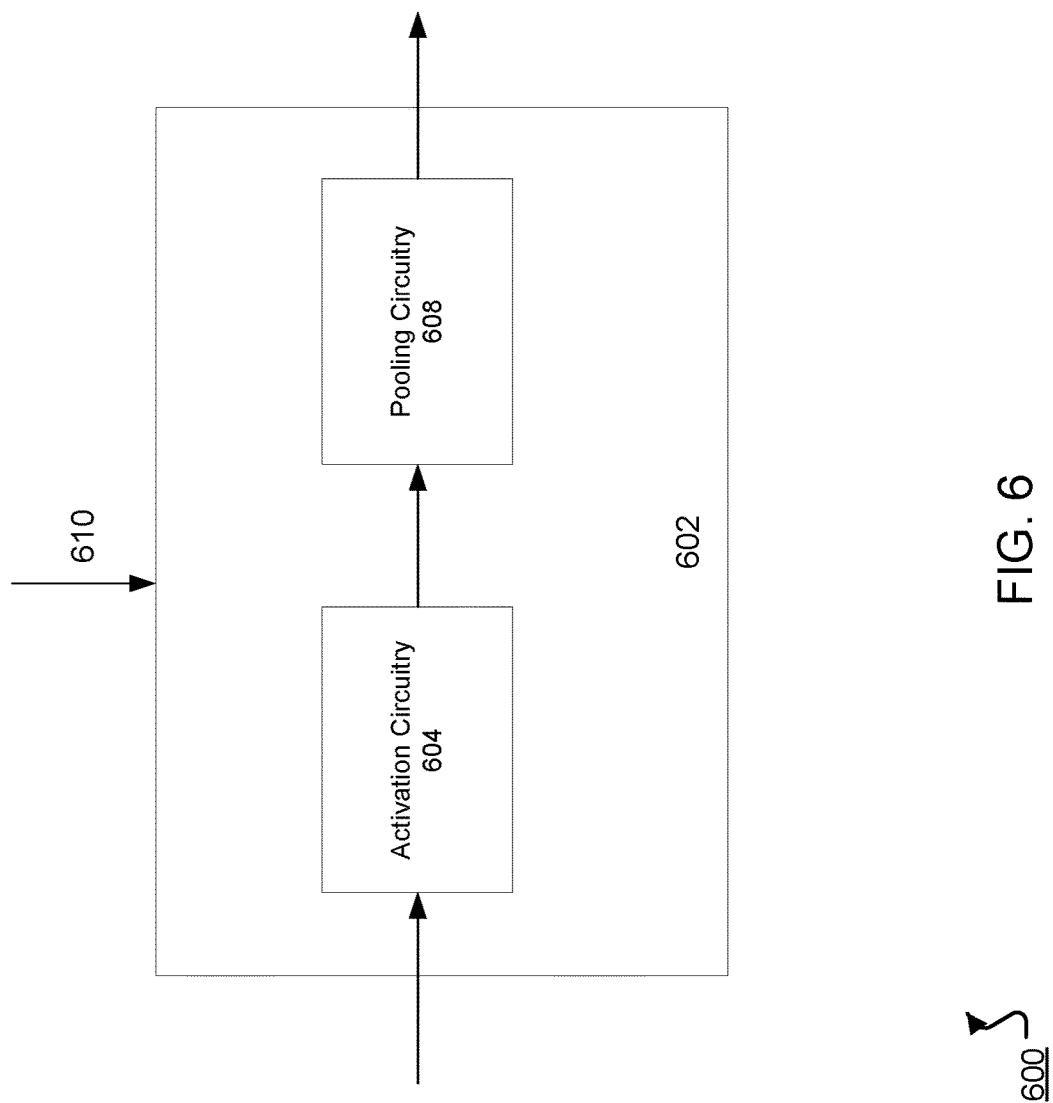
FIG. 6 shows an example architecture of a vector computation unit.

FIG. 6 shows an example architecture 700 of a vector computation unit 602. The vector computation unit 602 can receive a vector of accumulated values from a matrix computation unit, e.g., the matrix computation unit 312 described in reference to FIG. 3 or the accumulators 410 of the matrix computation unit of FIG. 4.

The vector computation unit 602 can process the vector of accumulated values at the activation unit 604. In some implementations, the activation unit includes circuitry that applies a non-linear function to each accumulated value to generate activation values. For example, the non-linear function can be tan h(x), where x is an accumulated value.

Optionally, the vector computation unit 602 can pool values, e.g., activation values, using pooling circuitry 608. The pooling circuitry 608 can apply an aggregation function to one or more of the values to generate pooled values. In some implementations, the aggregation functions are functions that return a maximum, minimum, or average of the values or of a subset of the values.

Control signals 610 can be transferred, e.g., by the sequencer 306 of FIG. 3, and can regulate how the vector computation unit 602 processes the vector of accumulated values. That is, the control signals 610 can regulate whether the activation values are pooled, where the activation values are stored, e.g., in the unified buffer 308, or can otherwise regulate handling of the activation values. The control signals 610 can also specify the activation or pooling functions, as well as other parameters for processing the activation values or pooling values, e.g., a stride value.

The vector computation unit 602 can send values, e.g., activation values or pooled values to a unified buffer, e.g., the unified buffer 308 of FIG. 3. In some implementations, the pooling circuitry 608 receives the activation values or pooled values and stores the activation values or pooled values in the unified buffer.

Figure 7:
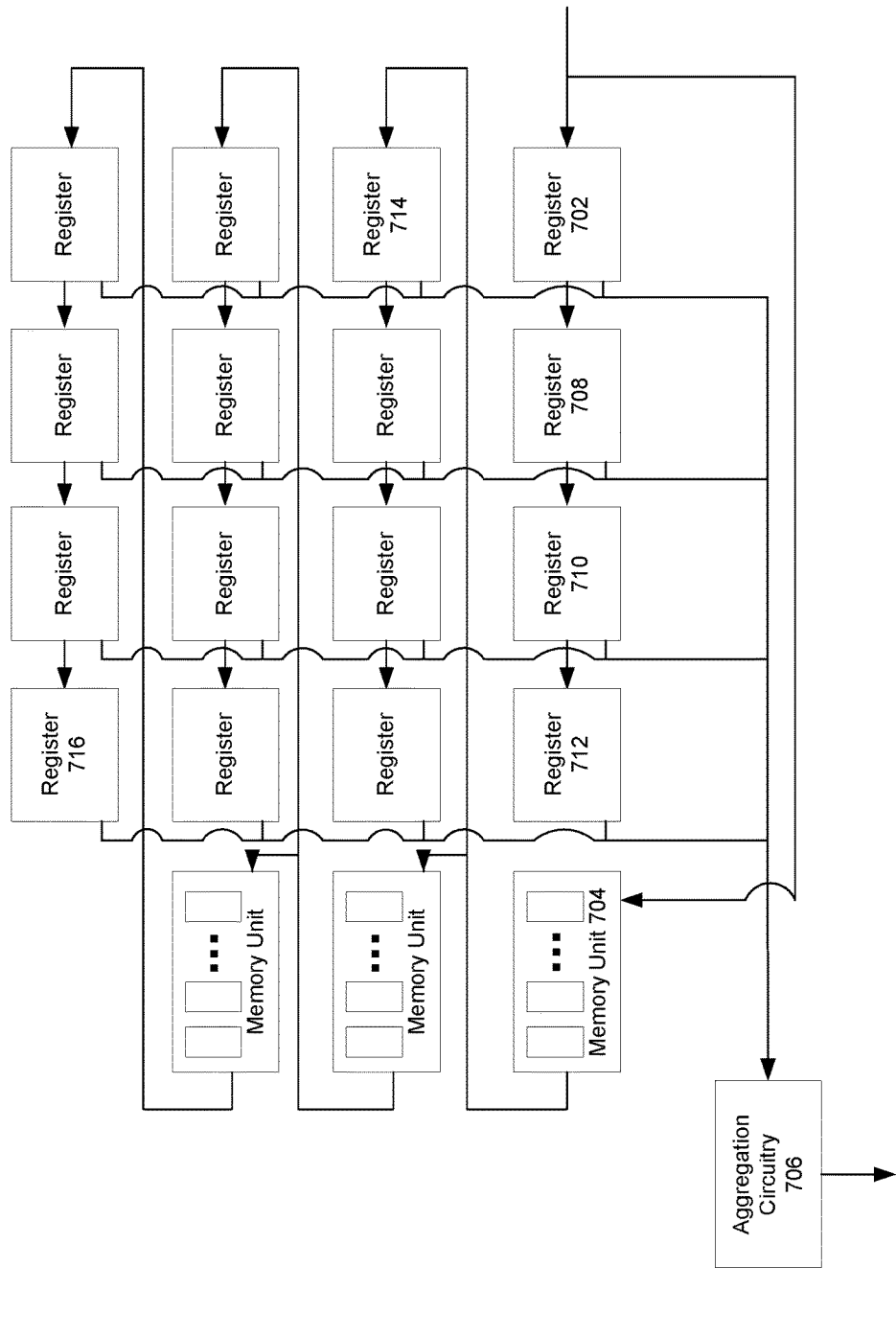
FIG. 7 shows an example architecture for pooling circuitry.

FIG. 7 shows an example architecture 700 for pooling circuitry. The pooling circuitry can apply an aggregation function to one or more activated values to generate pooled values. By way of illustration, the architecture 700 can perform a pooling of a 4×4 set of activated values. Although the pooling shown in FIG. 7 has a square region, i.e., 4×4, rectangular regions are possible. For example, if the region has a window of n×m, the architecture 700 can have n*m registers, i.e., n columns and m rows.

The pooling circuitry architecture 700 can receive a sequence of elements from the vector of values, e.g., from activation circuitry 604 of FIG. 6. For example, the sequence can represent pixels of an 8×8 portion of an image, and the pooling circuitry architecture 700 can pool values from a 4×4 subset of the 8×8 portion. In some implementations, pooled values are appended to the sequence once computed by the pooling circuitry architecture 700. In some implementations, the neural network processor includes multiple parallel pooling circuitries. Over each clock cycle, each pooling circuitry can receive a respective element from the vector of values from activation circuitry 604. Each pooling circuitry can interpret elements received from the activation circuitry 604 as a two-dimensional image arriving in raster order.

The pooling circuitry can include a series of registers and memory units. Each register can send an output to aggregation circuitry 706 that applies an aggregation function across the values stored inside the registers. The aggregation function can return a minimum, maximum, or average value from a set of values.

A first value can be sent to and stored inside register 702. On a subsequent clock cycle, the first value can shift to a subsequent register 708 and be stored in memory 704, and a second value can be sent to and stored inside register 702.

After four clock cycles, four values are stored inside the first four registers 702, 708-712. In some implementations, the memory unit 704 operates under first-in-first-out (FIFO). Each memory unit can store up to eight values. After the memory unit 704 contains a complete row of pixels, the memory unit 704 can send a value to register 714.

At any given point in time, the aggregation circuitry 706 can access values from each register. The values in the registers should represent values for a 4×4 portion of the image.

The pooling circuitry can generate a pooled value from the accessed values by using the aggregation circuitry 706, e.g., a maximum, a minimum, or an average value. The pooled value can be sent to a unified buffer, e.g., the unified buffer 308 of FIG. 3.

After generating the first pooled value, the pooling circuitry can continue to generate pooled values by shifting the values through each register so that new values are stored in the registers and can be pooled by the aggregation circuitry 706. For example, in architecture 700, the pooling circuitry can shift the values over 4 more clock cycles, thereby shifting the values in the memory units into the registers. In some implementations, the pooling circuitry shifts the new values until a new value is stored in a last topmost register, e.g., register 716.

The aggregation circuitry 706 can then pool the new values stored in the registers. A result of pooling the new values can be stored at the unified buffer.

Figure 8:
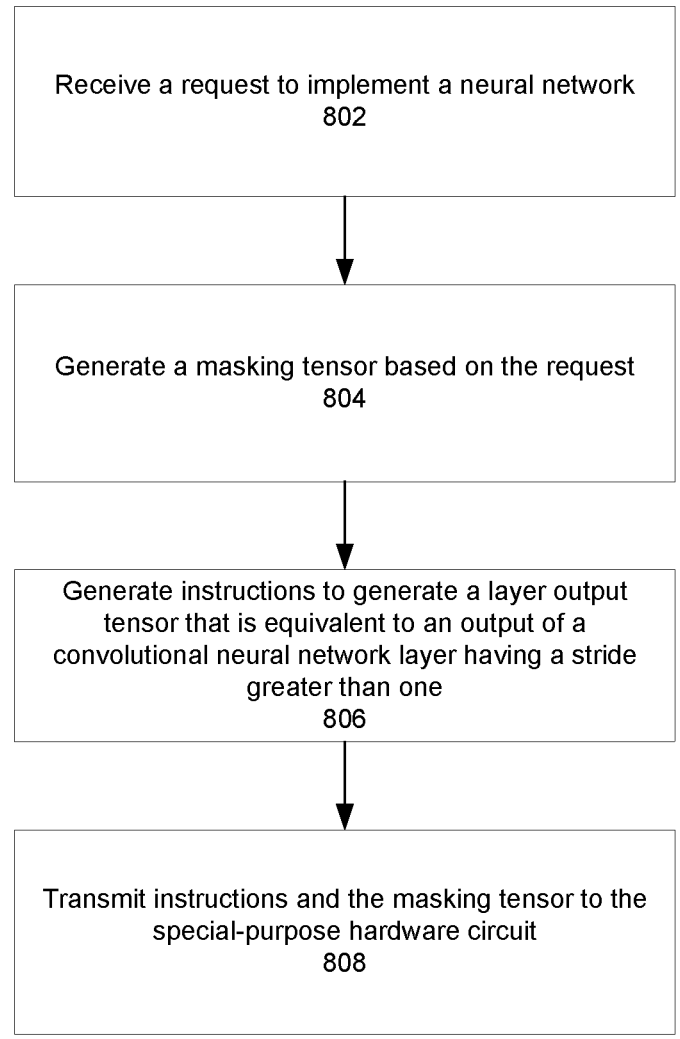
FIG. 8 is a flow diagram of an example method for instructing a neural network processing system to perform a computation for a given layer of a neural network with a stride greater than one.

FIG. 8 is a flowchart of an example process 800 for performing a computation for a given convolutional layer of a neural network with a stride greater than one. Generally, the process 700 is performed by a system of one or more computers that includes a special-purpose hardware circuit. In some implementations, the example process 800 can be performed by the system of FIG. 1.

The system receives a request to implement a neural network on the special-purpose hardware circuit (step 802). In particular, the neural network includes a convolutional neural network layer having a stride that is greater than one. The request may further specify other parameters for implementing the neural network, such as an input to process using the neural network, locations to store an output tensor generated by the neural network, or other parameters.

The system generates a masking tensor based on the request to be used in processing the neural network layer having the stride greater than one (step 804). For example, based on receiving the request to implement the neural network and information specifying an input to the neural network, the system generates a masking tensor for processing the neural network layer having the stride greater than one.

A size of the masking tensor may be determined based on dimensions of the specified input or an expected size of an input tensor to the neural network layer having the stride greater than one. Values included in the masking tensor may be determined based on the specified stride of the neural network layer that has the stride greater than one. For example, if a neural network layer has a specified stride of four, then every fourth element of the masking tensor may be set to one, while all other entries of the masking tensor may be set to zero. In some implementations, a neural network may include multiple layers having a stride greater than one, and the system may generate corresponding masking tensors for each of the layers having a stride greater than one. Additionally, in some implementations, the system may store, e.g., in memory, a library of masking matrices or masking matrices components, and may select or generate a masking matrix based using the library.

The system generates instructions that, when executed by the special-purpose hardware circuit 110, cause the special-purpose hardware circuit 110 to, during processing of an input tensor by the neural network, generate a layer output tensor that is equivalent to an output of the convolutional neural network layer having stride greater than one using the masking tensor (step 806). For example, in response to the request, the neural network implementation engine 150 can generate instructions that direct or control the special-purpose hardware circuit 110 to generate an output tensor, i.e., an output vector, that is equivalent to if the special-purpose hardware circuit 110 processed an input tensor using the convolutional neural network layer having a stride that is greater than one.

The system transmits the instructions and the masking tensor to the special-purpose hardware circuit 110 (step 808). For example, the neural network implementation engine 150 can provide the instructions to the special-purpose hardware circuit 110, and the special-purpose hardware circuit 110 can receive the instructions, e.g., at the host interface 302 of FIG. 3. The neural network implementation engine 150 may also provide other instructions and/or parameters for the neural network computation that can also be received by the host interface 302.

Figure 9:
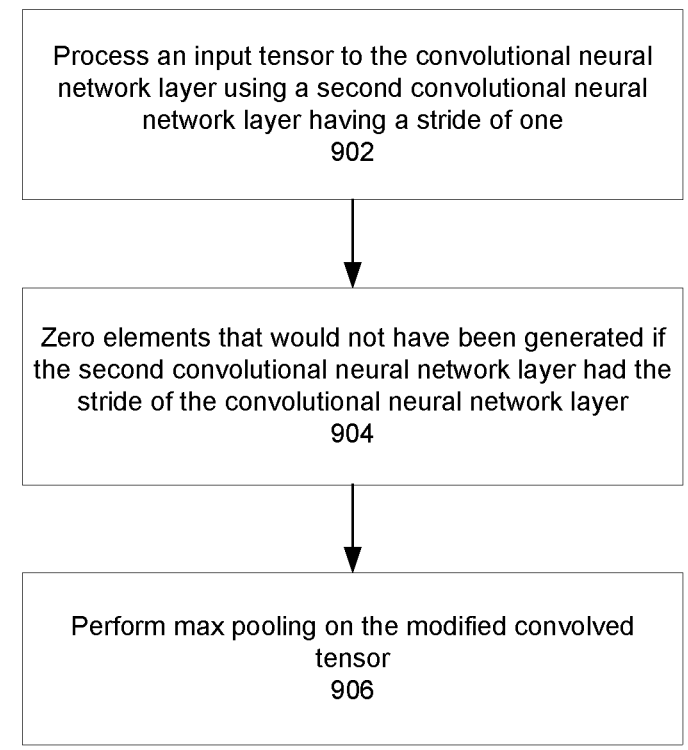
FIG. 9 is a flow diagram of an example method for performing a computation for a given layer of a neural network having a stride greater than one.

FIG. 9 is a flowchart of an example process 900 for computing a neural network computation layer having a stride greater than one. For example, the process 900 can be performed by the special-purpose hardware circuit 110 of FIG. 1 based on instructions received from the neural network implementation engine 150.

For example, upon receiving instructions for implementing the neural network layer having a stride greater than one, the host interface 302 can send the instructions to the sequencer 306 of FIG. 3, and the sequencer 306 can convert the instructions into low level control signals that control the special-purpose hardware circuit 300 of FIG. 3 to perform the neural network computation.

Based on the received instructions, the special-purpose hardware circuit 300 processes an input tensor to the convolutional neural network layer using a second convolutional neural network layer having a stride of one (step 902). For example, control signals generated from the received instructions control the special-purpose hardware circuit 300 to process the input tensor, e.g., an output of a preceding layer of the neural network stored in the unified buffer 308 or an input to the neural network specified or provided to the special-purpose hardware circuit 300, using a second convolutional neural network layer that has a stride that is equivalent to one but that is otherwise equivalent to the convolutional neural network layer, to generate a convolved tensor.

To process the input tensor using the second convolutional neural network layer, the control signals may control the unified buffer 308 to supply the input tensor, i.e., activation inputs which may correspond to the input to the neural network or to an output of a preceding neural network layer, to the matrix computation unit 312 of FIG. 3. The control signals may also instruct the direct memory access engine 304 and/or dynamic memory 310 of FIG. 3 to provide weights to the matrix computation unit 312 corresponding to the second neural network layer that has a stride of one, i.e., a unity stride, but that is otherwise equivalent to the neural network layer having a stride greater than one.

The sequencer 306 may further generate instructions that control the matrix computation unit 312 to process the input tensor using the weights, e.g., using the process described with respect to FIG. 3. In some implementations, the matrix computation unit 312 performs the convolution using techniques described in U.S. patent application Ser. No. 14/844,738, filed Sep. 3, 2015, which is hereby incorporated by reference in its entirety.

The matrix computation unit 312 performs computations based on the control signals, and outputs a convolved tensor to the vector computation unit 314. For example, the matrix computation unit 312 sends the vector computation unit 314 a vector of outputs generated by the matrix computation unit 312. The vector of outputs may be determined based on processing the input tensor using the weights corresponding to the neural network layer having a stride of one that is otherwise equivalent to the neural network layer having the stride greater than one. The vector computation unit 314 can store the convolved tensor at the unified buffer 308.

After processing the activation inputs through a convolutional neural network layer with a stride of one to produce the convolved tensor, the special-purpose hardware circuit 300 zeros out elements that would not have been generated if the second convolutional neural network layer had the stride of the convolutional network layer having the stride greater than one (step 904). Zeroing out an element refers generally to replacing the current values of the element with zero. Cancelling, i.e., zeroing, the values may be achieved by performing element-wise multiplication of the convolved tensor with a masking tensor, i.e., the masking tensor generated by the neural network processing engine 150 and transmitted to the special-purpose neural network.

To cancel those values of the convolved tensor that would not have been generated if the input tensor had been processed by a convolutional neural network layer with the specified stride the sequencer 306 can send control signals to control the matrix multiplication unit 312 to perform element-wise multiplication of the convolved tensor and the masking tensor. The convolved tensor may be sent from the unified buffer 308 to the matrix multiplication unit 312 based on other control signals from the sequencer 306, and the masking tensor may be sent to the matrix computation unit 312 based on control signals from the sequencer 306 to the direct memory access engine 304 or dynamic memory 310, i.e., after the masking tensor has been received by the special-purpose hardware circuit 300 and stored at the dynamic memory 310.

Generally, as described with respect to FIG. 8, the masking tensor is a vector that includes unity-value elements, i.e., values of one, in element positions corresponding to elements that would be produced by processing the input tensor with the convolutional neural network layer having the stride greater than one, and includes zero-value elements in all other positions, i.e., the positions corresponding to elements that would not be produced by processing the activation values with the convolutional neural network layer having the stride greater than one.

The masking tensor may be stored, for example, at the dynamic memory 310, and the sequencer 306 may send control signals to send the masking tensor to the matrix computation unit 312 from the dynamic memory 310. For example, the instructions provided to the special-purpose hardware circuit 300 may identify, e.g., provide a location in dynamic memory 310 of, the masking tensor, or may include data defining the masking tensor that is then stored at the dynamic memory 310, and the sequencer 306 may send control signals that cause the masking tensor stored at the location in dynamic memory 310 to be sent to the matrix computation unit 312. Additionally, the sequencer 306 may provide control signals to cause the convolved tensor stored at the unified buffer 308 to be provided to the matrix computation unit 312. The matrix computation unit 312 then performs element-wise multiplication of the convolved tensor and the masking tensor to generate a modified convolved tensor. The modified convolved tensor can be received by the vector computation unit 314 from the matrix computation unit 312. The vector computation unit 314 may optionally store the modified convolved tensor in the unified buffer 308.

Due to the element-wise multiplication with the masking tensor, the modified convolved tensor includes the values that would be output if the input tensor was processed using the neural network layer having the specified stride of greater than one. The modified convolved tensor includes zeros in positions corresponding to values output in the computation of the input tensor using the convolutional neural network layer with the stride of one that would not have been output if the input tensor were processed with the convolutional neural network having the specified stride. In other implementations, other methods of zeroing elements of the convolved tensor may be utilized. For example, the convolved matrix may be rewritten in the unified buffer 308 or another memory in a modified form, wherein elements corresponding to values output in the computation of the input tensor using the convolutional neural network having the specified stride are unchanged, and other elements are written as zero.

The vector computation unit 314 receives the modified convolved tensor and performs max pooling on the modified convolved tensor to generate a layer output tensor for the convolutional neural network layer having the stride greater than one (step 906). For example, the vector computation unit 314 may receive the modified convolved tensor from the matrix computation unit 312, and using pooling circuitry 608 may perform max pooling on the modified convolved tensor. Max pooling is an operation that receives a set of data and, for each of one or more subsets of the data, outputs the maximum value of the elements in the subset. Performing max pooling on the modified convolved tensor results in a tensor that includes, for each of multiple subsets of elements of the modified convolved tensor, a maximum value of the subset. The vector computation unit 314 may perform max pooling for windows of the modified convolved tensor determined based on the specified stride of the convolutional neural network layer. For example, for a stride of 2, the pooling circuitry 608 will perform max pooling using a 2×2 window to generate a layer output tensor that includes a maximum value element from each 2×2 window. For a neural network layer having a stride of 4, the pooling circuitry 608 will perform max pooling using a 4×4 window to generate a layer output tensor that includes a maximum value element from each 4×4 window. The result of the max pooling operation is stored by the vector computation unit 314 at the unified buffer 308, where the result is an output tensor that is equivalent to an output that would be produced if the special-purpose hardware circuit 300 had processed the input tensor using the neural network layer having the stride greater than one. Processing of subsequent a subsequent layer of the neural network may be performed using the layer output tensor to eventually obtain the inference of the neural network.

Figure 10:
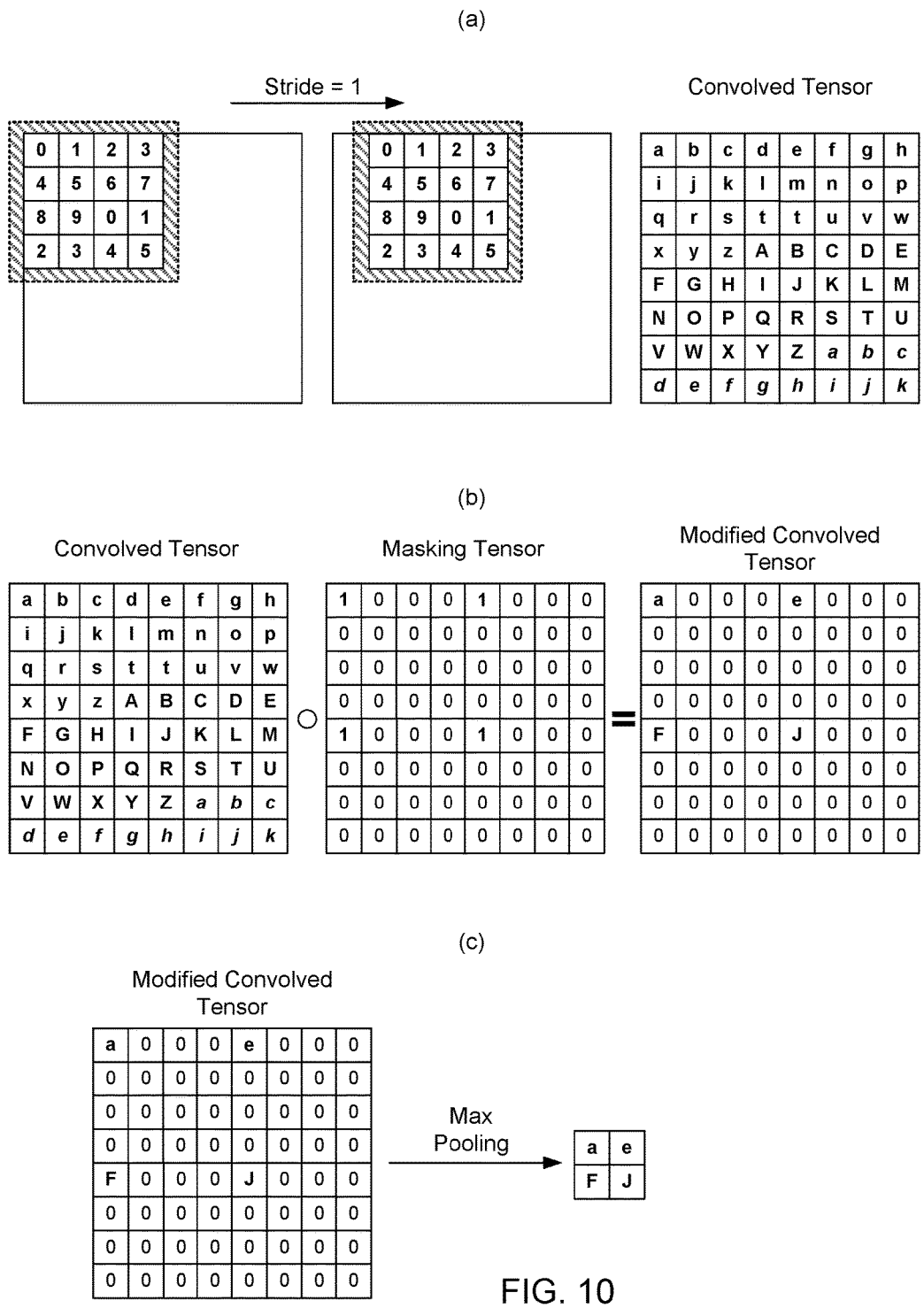
FIG. 10 is an example of a computation for a given layer of a neural network with a stride greater than one. Like reference numbers and designations in the various drawings indicate like elements.

FIG. 10 depicts an example of a computation for a given layer of a neural network with a stride greater than one. The example of FIG. 10 may be performed using the process of FIG. 7 and the special-purpose hardware circuit 300 of FIG. 2. By way of illustration, the example of FIG. 10 applies a convolutional neural network layer having a stride of four to an 8×8 array of activation values. The convolutional neural network layer may have a 4×4 kernel of weights to be applied to the 8×8 array of activation values. The activation values may represent an 8×8 portion of an image input to the neural network, i.e., a sequence of values corresponding to the 8×8 portion of the image. Alternatively, the 8×8 array of activation values may represent an 8×8 portion of another input tensor, e.g., an input tensor corresponding to an output of a preceding layer of the neural network.

In part (a) of FIG. 10, the 8×8 input tensor is processed using a convolutional neural network layer having a stride of one that is otherwise equivalent to the convolutional neural network layer having the stride greater than one. Thus, the 4×4 kernel of weights shown in part (a) may first be applied to the elements of the input tensor corresponding to the first four rows and first four columns of the input tensor (values not shown). A result of the process may be a first element in a resulting convolved tensor, i.e., the element "a" of the resulting convolved tensor shown in part (a) of FIG. 10.

Since processing of the input tensor is performed using a convolutional neural network layer with a stride of one instead of the specified stride of four, the 4×4 set of weights shown in part (a) may then be applied to the elements of the input tensor corresponding to the first four rows of the activation value array and the second through fifth columns of the input tensor (values not shown). A result of the processing is a second element of the convolved tensor, i.e., the element "b" of the convolution result shown at part (a) of FIG. 10. The process may be repeated by applying the 4×4 set of weights to the activation value array using a stride of one, i.e., by applying the 4×4 set of weights to the activation value array incrementally in both the column and row directions. The processing results in the 8×8 convolved tensor shown at part (a) of FIG. 10.

Element-wise multiplication is then performed between the convolved tensor and a masking tensor to obtain a modified convolved tensor, as shown in part (b) of FIG. 9. The size of the masking tensor is determined based on the size of the input tensor or the size of the convolved tensor, which will generally be equal due to the processing at part (a) of FIG. 10 using a convolutional neural network layer having a stride of one. The masking tensor includes unity values, i.e., ones, at positions that correspond to values that would be produced if the input tensor were processed using a convolutional neural network layer having the specified stride. Generally, then, the positions of the unity value entries in the masking tensor is dependent on the specified stride of the convolutional neural network layer. In the example of FIG. 10, because the convolutional neural network layer has a stride of four, the masking tensor would include unity values at every fourth position in both the column and row directions. The other entries of the masking tensor are assigned zero values, such that element-wise multiplication of the convolved tensor and the masking tensor will result in zeroing of all values that would not be produced if the input tensor were processed with the convolutional neural network having the specified stride.

Element-wise multiplication of the convolved tensor and the masking tensor is performed to produce a modified convolved tensor. As shown in FIG. 10, after the element-wise multiplication, every fourth element of the convolved tensor is maintained, and the remainder of the elements of the convolved tensor become zeros due to their multiplication with a corresponding zero-value element of the masking matrix. Thus, of the elements of the 8×8 convolved tensor, only four elements remain non-zero.

In some implementations, a similar result can be obtained by first multiplying elements of the convolved tensor by non-unity factors, and subsequently multiplying those elements by second non-unity factors. For instance, the masking tensor may include twos (or another value) at the positions that correspond to values that would be produced if the input tensor were processed using a convolutional neural network layer having the specified stride. Thus, following the example above, element-wise multiplication of the convolved tensor and the masking tensor produces a modified convolved tensor with every fourth element of the convolved tensor doubled, and the remainder of the elements being zero. Subsequently, scalar multiplication of the modified convolved tensor by one half (or an inverse of the other value) may be performed. Alternatively, element-wise multiplication of the modified convolved tensor with a second masking tensor may be performed, wherein the second masking tensor includes values of one-half at positions corresponding to values that would be produced if the input tensor were processed using a convolutional neural network layer having the specified stride.

Max pooling is subsequently performed on the modified convolution result array in part (c) of FIG. 10. The result of the max pooling is equivalent to the result that would be obtained if the input tensor had been processed by the convolutional neural network layer having the stride of four. Using the process of FIG. 6, max pooling is performed on the modified convolved tensor to identify the maximum value of each 4×4 window of the modified convolved tensor. The result of the max pooling is then stored as the output tensor of the convolutional neural network layer having the stride of four. Because the input tensor was an 8×8 array, processing by a neural network layer having a stride of four results in a 2×2 output array. The 2×2 output array may be stored in the unified buffer 308 of FIG. 2, e.g., in raster order. The values of the 2×2 output array may be provided as inputs to a subsequent layer of the neural network.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising;
receiving a request to process a neural network on a hardware circuit, the neural network comprising a first convolutional neural network layer having a stride that is greater than one; and
in response, generating instructions that when executed by the hardware circuit cause the hardware circuit to, during processing of an input tensor by the neural network, generate a layer output tensor that is equivalent to an output of the first convolutional neural network layer by performing operations comprising:
processing the input tensor to the first convolutional neural network layer using a second convolutional neural network layer that has a stride that is equal to one but is otherwise equivalent to the first convolutional neural network layer to generate a first tensor;
zeroing out elements of the first tensor that would not have been generated if the second convolutional neural network layer had the stride of the first convolutional neural network layer to generate a second tensor; and
performing max pooling on the second tensor to generate the layer output tensor.

2. The method of claim 1, wherein zeroing out elements of the first tensor comprises:
multiplying a subset of elements of the first tensor by zero; and
multiplying the elements of the first tensor that are not included in the subset by one.

3. The method of claim 1, wherein zeroing out elements of the first tensor comprises:
performing element-wise multiplication of a masking tensor and the first tensor to generate the second tensor, wherein the masking tensor comprises (i) zeros at each element position of the masking tensor that corresponds to an element of the first tensor that would not have been generated if the second convolutional neural network layer had the stride of the first convolutional neural network layer, and (ii) ones at each other element position of the masking tensor.

4. The method of claim 3, wherein the masking tensor is stored at a memory accessible by the hardware circuit, and wherein element-wise multiplication of the masking tensor and the first tensor is performed by a vector computation unit implemented in hardware that is included in the hardware circuit.

5. The method of claim 1, wherein zeroing out elements of the first tensor comprises:
performing element-wise multiplication of a first masking tensor and the first tensor to generate a modified first tensor, wherein the first masking tensor comprises (i) zeros at each element position of the masking tensor that corresponds to an element of the first tensor that would not have been generated if the second convolutional neural network layer had the stride of the first convolutional neural network layer, and (ii) a respective non-zero value at each element position of the masking tensor that corresponds to an element of the first tensor that would have been generated if the second convolutional neural network layer had the stride of the first convolutional neural network layer; and
performing element-wise multiplication of a second masking tensor and the modified first tensor, wherein the second masking tensor comprises, at each element position that corresponds to an element of the first tensor that would be generated if the second convolutional neural network layer had the stride of the first convolutional neural network layer, an inverse of the respective non-zero value of the first masking tensor.

6. The method of claim 1, wherein performing max pooling comprises obtaining, for each of one or more windows of the second tensor that are defined by the stride of the first convolutional neural network layer, a maximum value element of elements within the window.

7. The method of claim 6, wherein each of the one or more windows of the second tensor is a rectangular window having dimensions corresponding to the stride of the convolutional neural network layer, and includes different elements of the second tensor.

8. The method of claim 1, wherein performing max pooling comprises obtaining, for each of one or more subsets of elements of the second tensor, a maximum value element of the subset.

9. The method of claim 1, wherein the max pooling performed on the second tensor is performed by pooling circuitry of the hardware circuit.

10. The method of claim 1, wherein the convolutional neural network layer is a first neural network layer in the neural network, and wherein the input tensor is a representation of a digital image comprising elements that correspond to pixels of the digital image.

11. The method of claim 1, wherein the input tensor is stored at a unified buffer of the hardware circuit and weights of the second convolutional neural network layer are stored at a dynamic memory of the hardware circuit, and wherein processing the input tensor to the first convolutional neural network layer using the second convolutional neural network layer comprises:
sending the input tensor from the unified buffer to a matrix computation unit of the hardware circuit that is implemented in hardware;
sending the weights of the second convolutional neural network layer from the dynamic memory to the matrix computation unit of the hardware circuit; and
processing, by the matrix computation unit of the hardware circuit, the input tensor using the weights of the second convolutional neural network layer to generate the first tensor.

12. A system comprising:
a hardware circuit; and
one or more storage devices storing instructions that are operable, when executed by the hardware circuit, to cause the hardware circuit to perform operations comprising:
 processing an input tensor to a convolutional neural network layer having a stride that is greater than one using a second convolutional neural network layer having a stride that is equal to one but is otherwise equivalent to the convolutional neural network layer to generate a first tensor;
 zeroing out elements of the first tensor that would not have been generated if the second convolutional neural network layer had the stride of the convolutional neural network layer to generate a second tensor; and
 performing max pooling on the second tensor to generate a layer output tensor.

13. The system of claim 12, wherein zeroing out elements of the first tensor comprises:
 performing element-wise multiplication of a masking tensor and the first tensor to generate the second tensor, wherein the masking tensor comprises (i) zeros at each element position of the masking tensor that corresponds to an element of the first tensor that would not have been generated if the second convolutional neural network layer had the stride of the first convolutional neural network layer, and (ii) ones at each other element position of the masking tensor.

14. The system of claim 13, wherein the masking tensor is stored at a memory accessible by the hardware circuit, and wherein element-wise multiplication of the masking tensor and the first tensor is performed by a vector computation unit implemented in hardware that is included in the hardware circuit.

15. The system of claim 12, wherein performing max pooling comprises obtaining, for each of one or more windows of the second tensor that are defined by the stride of the first convolutional neural network layer, a maximum value element of elements within the window.

16. The system of claim 15, wherein each of the one or more windows of the second tensor is a rectangular window having dimensions corresponding to the stride of the convolutional neural network layer, and includes different elements of the second tensor.

17. The system of claim 12, wherein the max pooling performed on the second tensor is performed by pooling circuitry of the hardware circuit.

18. The system of claim 12, wherein the convolutional neural network layer is a first neural network layer in the neural network, and wherein the input tensor is a representation of a digital image comprising elements that correspond to pixels of the digital image.

19. The system of claim 12, wherein the input tensor is stored at a unified buffer of the hardware circuit and weights of the second convolutional neural network layer are stored at a dynamic memory of the hardware circuit, and wherein processing the input tensor to the first convolutional neural network layer using the second convolutional neural network layer comprises:
 sending the input tensor from the unified buffer to a matrix computation unit of the hardware circuit that is implemented in hardware;
 sending the weights of the second convolutional neural network layer from the dynamic memory to the matrix computation unit of the hardware circuit; and
 processing, by the matrix computation unit of the hardware circuit, the input tensor using the weights of the second convolutional neural network layer to generate the first tensor.

20. A computer readable storage device encoded with a computer program, the program comprising instructions that, if executed by one or more computers, cause the one or more computers to perform operations comprising:
 receiving a request to process a neural network on a hardware circuit, the neural network comprising a first convolutional neural network layer having a stride that is greater than one; and
 in response, generating instructions that when executed by the hardware circuit cause the hardware circuit to, during processing of an input tensor by the neural network, generate a layer output tensor that is equivalent to an output of the first convolutional neural network layer by performing operations comprising:
  processing the input tensor to the first convolutional neural network layer using a second convolutional neural network layer that has a stride that is equal to one but is otherwise equivalent to the first convolutional neural network layer to generate a first tensor;
  zeroing out elements of the first tensor that would not have been generated if the second convolutional neural network layer had the stride of the first convolutional neural network layer to generate a second tensor; and
  performing max pooling on the second tensor to generate the layer output tensor.

* * * * *